Aug. 17, 1943.  H. B. FUGE  2,326,996
FOOD-MIXER SUPPORT
Filed Aug. 21, 1941   2 Sheets-Sheet 1

Inventor
Harry B. Fuge

Aug. 17, 1943.  H. B. FUGE  2,326,996
FOOD-MIXER SUPPORT
Filed Aug. 21, 1941  2 Sheets-Sheet 2
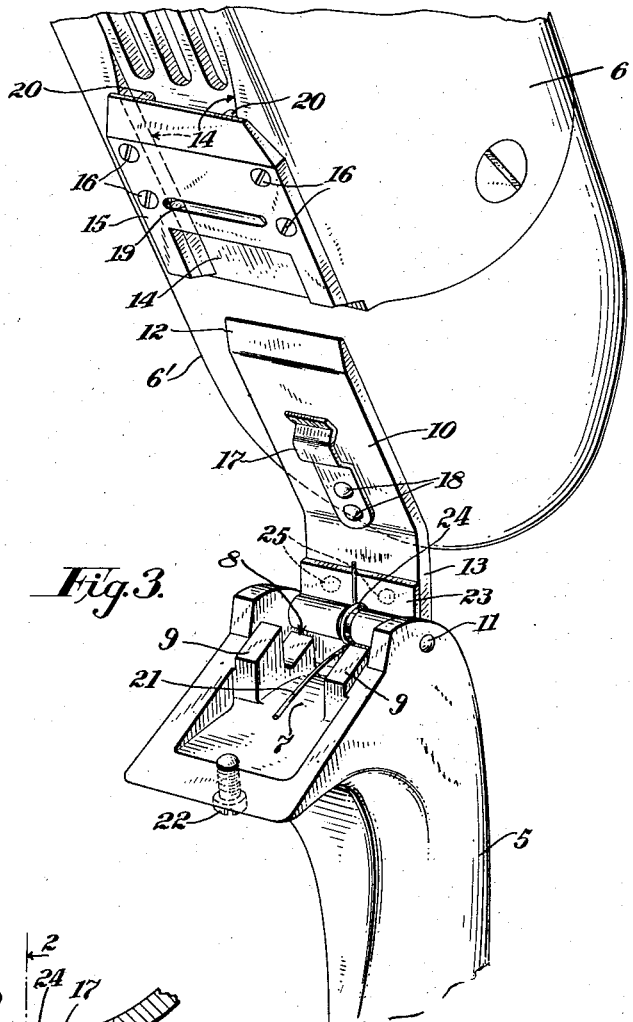
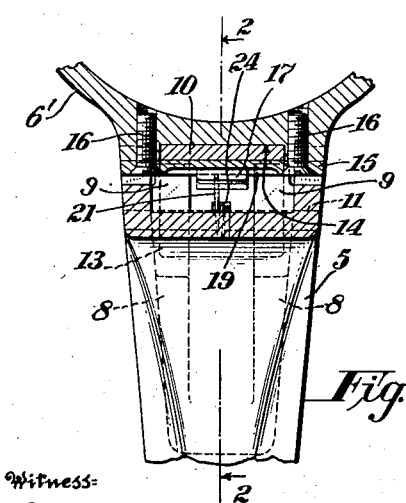
Inventor
Harry B. Fuge
By John F. Heine
Attorney
Witness:
John N. Cave Patented Aug. 17, 1943

2,326,996

UNITED STATES PATENT OFFICE 2,326,996

FOOD-MIXER SUPPORT

Harry B. Fuge, Elizabeth, N. J., assignor to The Singer Manufacturing Company, Elizabeth, N. J., a corporation of New Jersey Application August 21, 1941, Serial No. 407,709

2 Claims. (Cl. 248—13)

This invention relates to a support particularly adapted for supporting the power unit in a motor-driven food mixer.

One object of the invention is to produce an improved support which is sturdy, simple, and attractive in appearance.

Another object is to provide an adjustable pivotal connection between an upstanding supporting arm and a portable power unit which permits said power unit to be selectively swung into either a working or a non-working stable position and to be held in the selected position by gravitational forces.

A further object is to provide a detachable connection between an upstanding supporting arm and a power unit which permits the power unit to be readily and entirely removed from the supporting arm whenever it is required to use the power unit at some other place, and which includes means for biasing a receiving element on said supporting arm so that it automatically presents itself in the proper position to be conveniently engaged by the power unit whenever it is desired to return said power unit to its arm-supported position.

With the above and other objects in view, as will hereinafter appear, the invention comprises the devices, combinations and arrangements of parts hereinafter set forth and illustrated in the accompanying drawings of certain specific embodiments of the invention from which the several features of the invention and the advantages obtained thereby will be readily understood by those skilled in the art.

In the accompanying drawings, Fig. 1 is an elevational view showing a food mixer having an improved supporting means embodying the invention.

Fig. 3 is a perspective view showing an improved support in position to receive a power unit which is presented to it.

Fig. 4 is a fragmentary enlarged vertical sectional view taken on the line 4—4, Fig. 2, and looking in the direction of the arrows.

Figure 1:
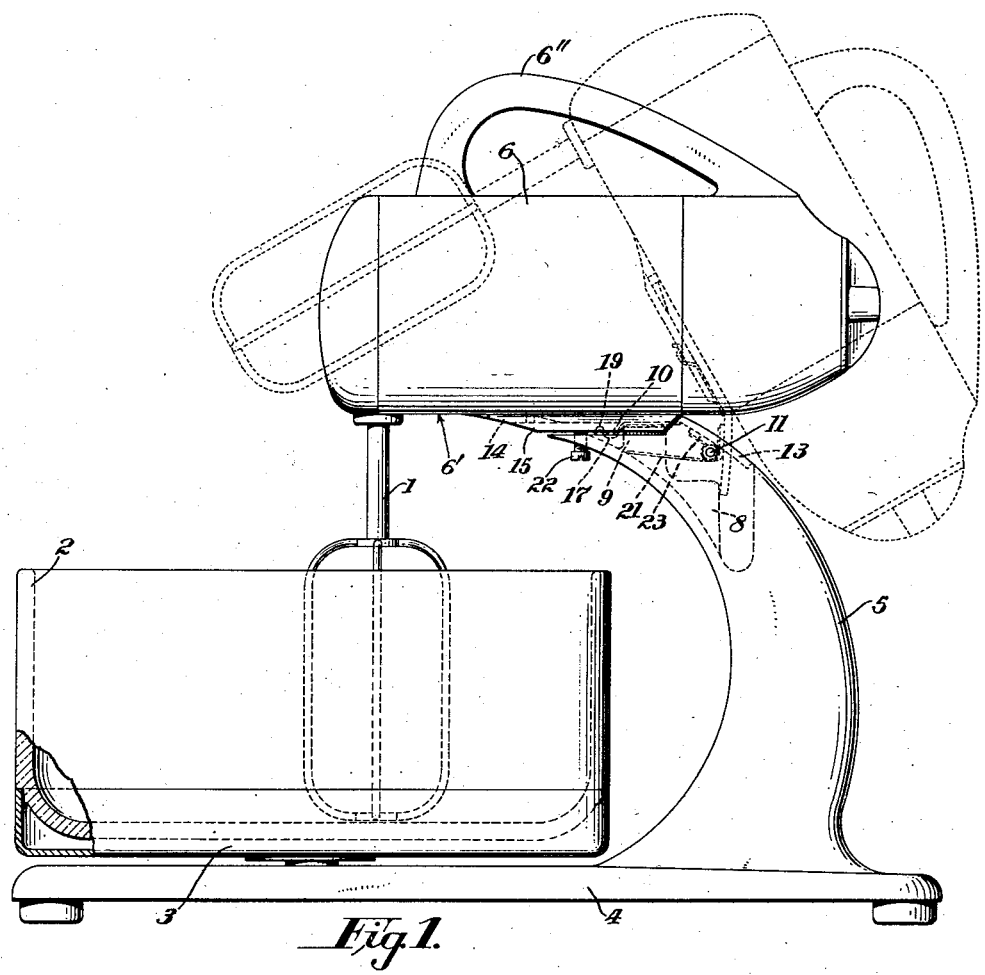

Referring to the drawings, this invention is shown as applied to a food mixing device in which a suitable agitator or beater unit 1 is arranged to operate within a food receptacle 2. The food receptacle or bowl 2 is supported by a suitable turntable 3 mounted on the base 4 which carries at one end an upstanding arm 5 preferably formed integral with said base and providing a supporting frame for a power unit denoted generally by the reference numeral 6.

The term "power unit" used herein refers to an assembly of parts including a motor with its associated gearing and speed control device mounted in a casing with a handle substantially as found in general use in food mixers.

The beater element 1 is arranged to be driven from a motor (not shown) housed preferably in a three-part casing 6′, Fig. 1, from which said beater depends. A handle 6″, secured to the top of the casing provides means for tipping the power unit up to its non-working position so that the bowl may be removed and also for carrying the portable power unit to any point where it is desired to use it independently of its normal supporting means.

Figure 2:
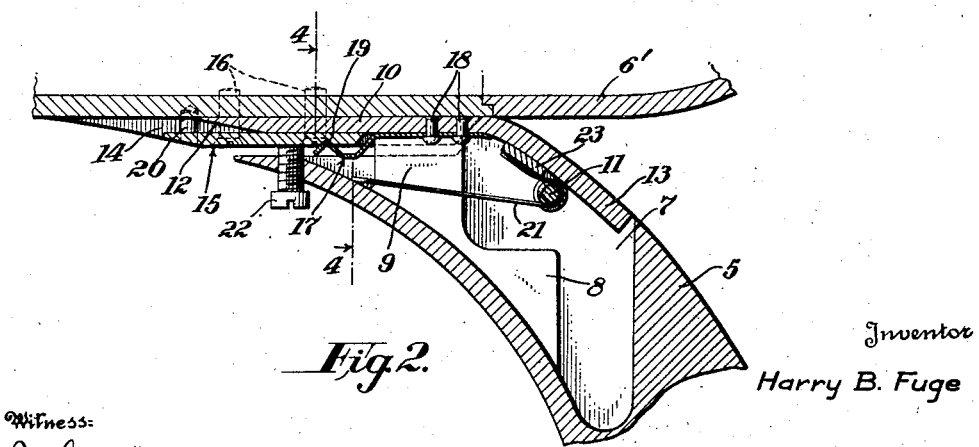
Fig. 2 is a fragmentary enlarged vertical sectional view taken on the lines 2—2, Fig. 4, and showing a preferred arrangement of parts for mounting a power unit in a food mixer.

Referring now to that part of the construction which is the subject of this invention, the upstanding arm 5 is formed at its free end with a hollowed-out cavity portion 7 within which are located abutments 8—8 and 9—9, as seen best in Fig. 3. This hollowed-out portion presents a cavity open at the top and contains a tongue member 10 pivoted near its rear edge on a pivot-pin 11 carried horizontally between the vertical side walls of said cavity portion. The tongue member 10 is formed with a beveled forward edge portion 12 and has its rear portion 13 bent down to conform to the adjacent contour of the upstanding arm 5 when the unit is in its normal operating position, as shown best in Figs. 1 and 2. This construction produces a blending of parts giving the pleasing effect of a continuous unbroken surface over the arm right up to the juncture between the upstanding arm 5 and the casing 6′.

The power unit casing 6′ is preferably formed with a longitudinal under-side channel 14 which is covered by a separate plate 15 secured to the casing by means of screws 16 thus forming a complemental slot which receives the tongue member 10 in sliding engagement. It is also contemplated that the slot may be cast integrally with the casing 6′ thus eliminating the separate cover-plate 15 and screws 16. A spring detent 17 is secured to the under side of the tongue member 10 by suitable means such as rivets 18 and is adapted to yieldingly engage a transverse groove or recess 19 formed in the cover-plate 15 thereby to prevent accidental withdrawal of the power unit from the supporting tongue member 10 when it is in the working position as shown by the full lines of Fig. 1. Stop-pins 20 spaced apart and secured to the cover-plate 15 adjacent one end thereof extend transversely across the channel 14 and serve to limit the depth to which the tongue member 10 may slide within the channel 14. Further, said pins 20 provide a partially open end for the channel 14 to allow any obstructions to be pushed through to avoid clogging. This limiting action of pins 20 on the tongue member 10 fixes the spatial relation between the pivotal axis of the pin 11 and the center of gravity of the power unit so that, as the power unit is swung into and out of working position, its center of gravity is shifted from one side to the other of a vertical plane through the pivotal axis. This directs the gravitational force due to the weight of the power unit so that it tends to hold said power unit stable in whichever position it is selectively set, the two positions being clearly shown by the full and dotted lines respectively of Fig. 1.

A coil-spring 21, positioned around the pivot-pin 11, bears against the inside of the front wall of the cavity 7 in the upstanding arm and provides a simple and direct means for biasing the tongue member 10, alone, to an upstanding receiving position, as shown best in Fig. 3. In this position, the tongue member may be readily engaged by the covered channel 14 when it is desired to return the power unit to its arm-supported position. This feature is of considerable importance in simplifying the manipulation required by the operator in returning the power unit to its position of engagement with the tongue member because one hand of the operator, which otherwise would be engaged in raising the tongue member into a position for receiving the power unit is, in this construction, free for carrying out other work.

In order to adapt the mixer to use various bowls of different size, means are provided for selectively adjusting the height of the beater 1 above the bottom of the bowl 2, which means comprises a screw 22 vertically positioned and threaded into the free end of the upstanding arm and extending through said arm to bear against the under side of the plate 15. It is seen that by adjusting the screw 22, which is readily accessible to the operator, the relative position of the power unit and the bowl may be controlled accurately and over a sufficient range to accommodate bowls of different thickness and to bring the bottom of the beater unit 1 into a position for most efficiently mixing the contents of the bowl 2. This screw 22 normally forms the stop for the power unit by which to adjust its horizontal working position. However, the abutment 9—9 serves as a limiting stop against which the tongue member 10 bears vertically to support the power unit in case the screw 22 fails for any reason to make contact with the cover-plate 15. Similarly, the abutment 8—8 forms a stop against which the rear portion 13, of the tongue member, bears to properly fix its extreme upstanding non-working position.

A simple strap hinge 23 provided with a slot 24 for containing that part of the spring 21 which embraces the pivot-pin 11, is secured to the tongue member 10 by any suitable means such as the spot welds 25.

It is seen that, in the working position, the tongue member 10 is guided and positioned between the side walls of the cavity 7 to maintain the proper relative lateral position of beater unit 1 and bowl 2.

It is to be understood that this construction has been devised with a view to making the parts few, simple and accessible, not only for ease of assembly, but also for facility in maintenance and cleaning.

From the foregoing it will be perceived that I have provided an improved detachable pivotal support for a food mixer which affords convenient manipulation to move the power unit from one stable beater position to another, to remove said power unit entirely for independent use or to restore it to its arm-supported position, and which includes a receiving element which automatically elevates itself to the proper position to conveniently receive the power unit.

It will be obvious to those skilled in the art that the invention may, without departure from its essential attributes, be embodied in various specific forms other than those shown and described, which latter are to be considered in all respects as illustrative of the invention and not restrictive; reference being had to the appended claims rather than to the foregoing description to indicate the scope of the invention.

Having thus set forth the nature of the invention, what I claim herein is:

1. In a food mixer having a base, an upstanding arm secured to the base, and a power unit; means for detachably securing the power unit to the upstanding arm and for providing an axis about which the power unit may be swung from and returned to a working position, said means comprising a spring-biased tongue member pivotally mounted on the free end of said upstanding arm and slidingly received within a complemental covered channel formed in the power unit casing, and a spring-pressed latch yieldingly secured to the tongue member and engaging a transverse groove in said casing, whereby to prevent accidental removal of the power unit when it is in its working position.

2. In a mixing device having a base on which is mounted an upstanding supporting arm and a portable power unit; means for detachably and pivotally securing said power unit to the upstanding arm, comprising a spring-biased tongue member pivoted to swing about a horizontal axis fixed in the upper end of the upstanding arm and slidingly received within a slot formed by a channel in the power unit casing provided with a cover-plate having stop-pins at one end to properly position said power unit relative to said axis, said cover plate having a transverse groove engaged by a spring detent yieldingly secured to the tongue member, whereby to resist any accidental displacement of the power unit from full engaged position with said tongue member.

HARRY B. FUGE.